(12) United States Patent
Hansch et al.

(10) Patent No.: US 7,213,315 B2
(45) Date of Patent: May 8, 2007

(54) MACHINE TOOL PROVIDED WITH PALLET CHANGING MODULE

(75) Inventors: Stefan Hansch, Aalen (DE); Peter Bielitza, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 0 days.

(21) Appl. No.: 10/539,272

(22) PCT Filed: Dec. 4, 2003

(86) PCT No.: PCT/EP03/13717

§ 371 (c)(1),
(2), (4) Date: May 10, 2006

(87) PCT Pub. No.: WO2004/054753

PCT Pub. Date: Jul. 1, 2004

(65) Prior Publication Data

US 2006/0287174 A1    Dec. 21, 2006

(30) Foreign Application Priority Data

Dec. 16, 2002 (DE) ................ 102 58 734

(51) Int. Cl.
*B23Q 7/02* (2006.01)
*B23Q 39/04* (2006.01)
*B23Q 3/157* (2006.01)
*B23P 23/00* (2006.01)
*B23C 1/04* (2006.01)

(52) U.S. Cl. ............... 29/33 P; 483/14; 409/165; 409/192; 408/42; 408/50; 29/38 A; 198/346.1

(58) Field of Classification Search ........... 29/33 P, 29/563, 27 C, 27 R, 38 A, 38 R, 37 R, 38 B; 483/14–15; 409/158–159, 161, 165, 172–173, 409/192, 203, 213, 217; 408/31, 42, 43, 408/50; 198/346.1, 345.3; 414/286
See application file for complete search history.

(56) References Cited

U.S. PATENT DOCUMENTS 2,271,848 A * 2/1942 Tcimpidis ............... 409/198

(Continued)

FOREIGN PATENT DOCUMENTS

DE       2443184 A * 3/1976
EP       032890 A1 * 7/1981

(Continued)

OTHER PUBLICATIONS

Search Report for International Application No. PCT/EP2003/013717 mailed Apr. 22, 2004.

*Primary Examiner*—Erica Cadugan
(74) *Attorney, Agent, or Firm*—Wolf, Greenfield & Sacks, P.C.

(57) ABSTRACT

The invention relates to a machine tool, in particular to cutting machine tools. The inventive machine tool comprises at least two machining modules provided with at least one spindle with a horizontally oriented axis and at least one clamping module having a tooling surface for at least one part which is horizontally oriented and rotatable around a vertical axis. The clamping module includes structure for a rigid coupling thereof to the machining module. One or several clamping modules and/or machining modules are provided with at least one fictive midplane which is parallel with respect to the spindle axis. The machine tool also includes at least one pallet changing module which is connected to the clamping module asymmetrically with respect to the midplane.

10 Claims, 4 Drawing Sheets

U.S. PATENT DOCUMENTS

| | | | |
|---|---|---|---|
| 4,832,170 A | * | 5/1989 | Takeuchi et al. ............. 29/33 P |
| 4,844,678 A | * | 7/1989 | Schenk ........................ 29/563 |
| 4,915,569 A | * | 4/1990 | Cherko .................... 198/346.1 |

FOREIGN PATENT DOCUMENTS

| | | |
|---|---|---|
| EP | 0908269 B1 | 1/2004 |
| JP | 2003340673 A | 12/2003 |

* cited by examiner

MACHINE TOOL PROVIDED WITH PALLET CHANGING MODULE

FIELD OF THE INVENTION

The invention relates to a machine tool, in particular for machining workpieces.

Such machine tools are used to shape and machine a wide range of workpieces made of metallic materials, particularly light metal. It is possible to machine and produce workpieces that have a complex shape and in which several different machining operations often have to be performed, in some cases using different tools as well. Apart from machining the workpiece as quickly and precisely as possible, which is to be performed as far as possible without retooling the workpiece, that is to say without remounting it onto a clamping table or the like, the machine tools are intended to permit short retooling times between machining two different workpieces, thereby providing the machine tool with retooling times which are as short as possible.

PRIOR ART

The use of so-called modular machine tools is well known. These are machine tools that comprise at least one machining module to which the spindle is attached, and a clamping module onto which the workpiece can be mounted during machining. The modular design is chosen such that different versions of the spindle can be coupled for example to a specific clamping module and vice versa.

Furthermore, machine tools are known that additionally comprise a pallet changing module which, in relation to the clamping module, is symmetrically attached thereto and which is used to move the workpieces onto the clamping module and remove them therefrom. The pallet changing module is structured for example to include two workpiece receiving zones, thus causing a first workpiece that is attached to the pallet changing module to be clamped straight by the clamping module and to undergo machining by means of the spindle module, i.e. the machining module, while in the second workpiece zone of the pallet changing module, a second workpiece can be removed in a straight position from the pallet changing module and a new workpiece can be placed thereon, it being possible to pivot this new workpiece onto the clamping module as a result of, for example, a rotational movement into the machining and clamping position after the first workpiece has finished being machined. In consequence, the retooling times can be kept to a minimum, because it is not necessary to perform the complete retooling operation while the machining module is at a standstill; instead it is possible to perform the actual removal and loading of the workpiece regardless of whether the workpiece has finished being machined or has started to be machined. One example of such a layout is depicted in EP 0 908 269 A2; in this example, machining is, moreover, effected by means of two spindles which face one another and which have parallel axes. The axial direction is perpendicular to the rotary axis of the pallet changing device and perpendicular to the connection between the machining and clamping positions.

JP 2003-340673 A (Patent Abstracts of Japan) depicts a rotatable pallet changing device that is positioned with its rotary axis centrically on a bed. The device can rotate pallets from a clamping position into a machining position. In the machining position, the pallets are located centrically over the axis or centre line of a machining table of a machine tool that is fixed to the bed. The rotary axis is not aligned with the centre line.

SUMMARY OF THE INVENTION

It is the object of the present invention to provide a modular-design machine tool that entails a high degree of flexibility during module set-up, is suitable for dry-type machining and offers a high degree of flexibility regarding the machining module's configuration relative to the clamping module.

The invention is based on the idea of retaining a horizontally oriented or aligned spindle axis, because, in the case of a horizontally oriented spindle, the swarf that is obtained during dry machining can fall unhindered down into the machine tool's waste-disposal channel. To nevertheless provide a high degree of flexibility regarding the positioning of the machining module, along with its horizontally oriented spindles or spindle, onto the clamping module which is fixedly connected to a pallet changing module, the pallet changing module is aligned asymmetrically relative to a mid-plane that indicates the middle of the clamping module and machining module and which extends essentially parallel to the direction of the spindle axis. This makes it possible to realize not only a so-called single-spindle version, i.e. a machine tool that comprises a machining module with a horizontally oriented spindle, but also configurations designed as so-called dual-spindle versions, i.e. layouts in which two machining modules are provided, these modules being positioned at an angle of 90° in relation to one another, in other words the spindle axes extend at an angle of 90° relative to each other, without entailing any modifications to the clamping module/pallet changing module combination.

This is preferably brought about in that the pallet changing module does not project over two of the vertically oriented faces of the essentially cuboid clamping module. The machining modules can be coupled to these faces above which the pallet changing module does not protrude.

Finally, the asymmetrical configuration of the pallet changing module on the clamping module makes it possible for a so-called synchronous design to be created in which two configurations of machining module, clamping module and pallet changing module are coupled together in mirror-symmetrical fashion, which enables two workpieces to be machined synchronously in a relatively compact space.

Furthermore, the horizontal configuration of the spindle and the provision of a separate machining module that is coupled just to one of the end faces of the cuboid clamping module make it possible to readily separate the drive mechanism and the clamping chamber, thereby reducing the risk of swarf entering the drive chamber. Since the configuration of the pallet changing module in a horizontal direction is already well known and because suitable conveying techniques for loading and unloading the pallet are provided in many machining zones, the configuration is, additionally, advantageous to the extent that as a result of the pallet changing module's design, which is likewise horizontal and which hence does not differ with regard to loading and unloading, there is no need for new apparatus for loading and unloading workpiece pallets. At the same time, the set-up remains relatively rigid, thus enabling the machine tool to be used not only for light-metal machining but also for the machining of cast or steel parts.

Thus, in accordance with a preferred embodiment, the clamping module is essentially cuboid and the pallet changing module is coupled in an off-centre fashion to the clamping module such as to project above a maximum of two of the vertically oriented lateral faces of the cuboid. This configuration makes it possible to achieve the aforementioned different design versions, namely the single-spindle design, the dual-spindle design and the synchronous design without modifying the connection between the clamping module and the pallet changing module.

For example, the pallet changing module is coupled at an angle of approx. 45° relative to the aforementioned mid-plane, i.e. on an imaginary, horizontally extending axis which extends from the centre of the clamping module into one of its corners. As a result, moreover, this approach provides particularly ready access to the workpiece that is to be set up, with the pallet changeover device permitting not just manual loading but also robot loading that is effected in parallel with the operating time, for example with a gantry-type or articulated arm.

For this purpose, the pallet changing module preferably has at least two pallet carriers so that in parallel with the production time, i.e. while one workpiece is being machined on one of the pallets, the other workpiece can be loaded. This reduces the machine tool's set-up times and hence standstill times.

According to a particularly preferred embodiment, the pallet changing module is designed for this purpose as a turntable that has a rotational axis extending, in a horizontal position, on an imaginary line from the centre of the clamping module to one of its corners. The rotational axis of the turntable extends vertically. This means that the turntable is per se in a horizontal position, thus making the turntable suitable for conventional loading and unloading devices for the workpiece pallets.

The layout preferably comprises two machining modules, a clamping module and a pallet changing module, with the machining modules being connected to the clamping module at an angle of 90° relative to one another and the pallet changing module being positioned in off-centre fashion at each of the imaginary mid-planes, these mid-planes extending through one machining module each and through the clamping module and being oriented vertically. At the same time, this layout means that the imaginary planes are each parallel to the spindle axes of a machining module. In accordance with a particularly preferred embodiment, the pallet changing module is positioned such as to be located essentially in the region of that point of intersection of two end faces of the clamping module at which no machining module is provided and which each extend vertically. This makes it possible for a workpiece which is mounted on the clamping module to be machined synchronously by two spindles that are positioned perpendicular to one another and the spindle axis of which extends horizontally in each case.

According to an alternative embodiment, two machining modules, the spindle-axis directions of which extend parallel to one another and horizontally in each case, are each coupled to a clamping module, whereby, in addition, each of the clamping modules is provided with one pallet changing module respectively. This means that the configuration is essentially symmetrical in relation to a plane of symmetry that extends vertically and separates the first machining module and the first clamping module from the second machining module in combination with the second clamping module.

According to a particularly preferred embodiment, the machining module is designed as a triaxial machining unit. For example, for this purpose, the spindle is supported at a first end of a pivoting arm so as to be moved in linear fashion in the direction parallel to the spindle's rotational axis, and the pivoting arm at its second end is rotatably supported around an axis parallel to the spindle's rotational axis, whereby the support of the pivoting arm is in turn movable in a direction perpendicular to the spindle's direction of movement, i.e. vertically in the present instance, regardless of the pivoting position of the pivoting arm. As a result, it is possible to combine circular and linear axes for the spindle movement, which results in a very compact and hence rigid basic set-up. Low moving masses result therefrom, which are the prerequisite for high dynamic values and ultimately the criterion for using direct drives, too. Alternatively, ball screws can be used as drive components as well.

Finally, each machining module is advantageously provided with at least one tool magazine on the machining module. As a result the tools can be loaded directly via the main spindle into and out of the tool magazine.

The clamping module is advantageously designed as a turntable. Conventional NC turntables can be used, such turntables making it possible to present the workpiece in different spindle positions. Instead of a turntable, reversible clamping devices can for example be used as well.

BRIEF DESCRIPTION OF THE DRAWINGS

The invention will now be described, purely by way of example, on the basis of the attached figures in which.

WAYS TO CARRY OUT THE INVENTION

Figure 1:
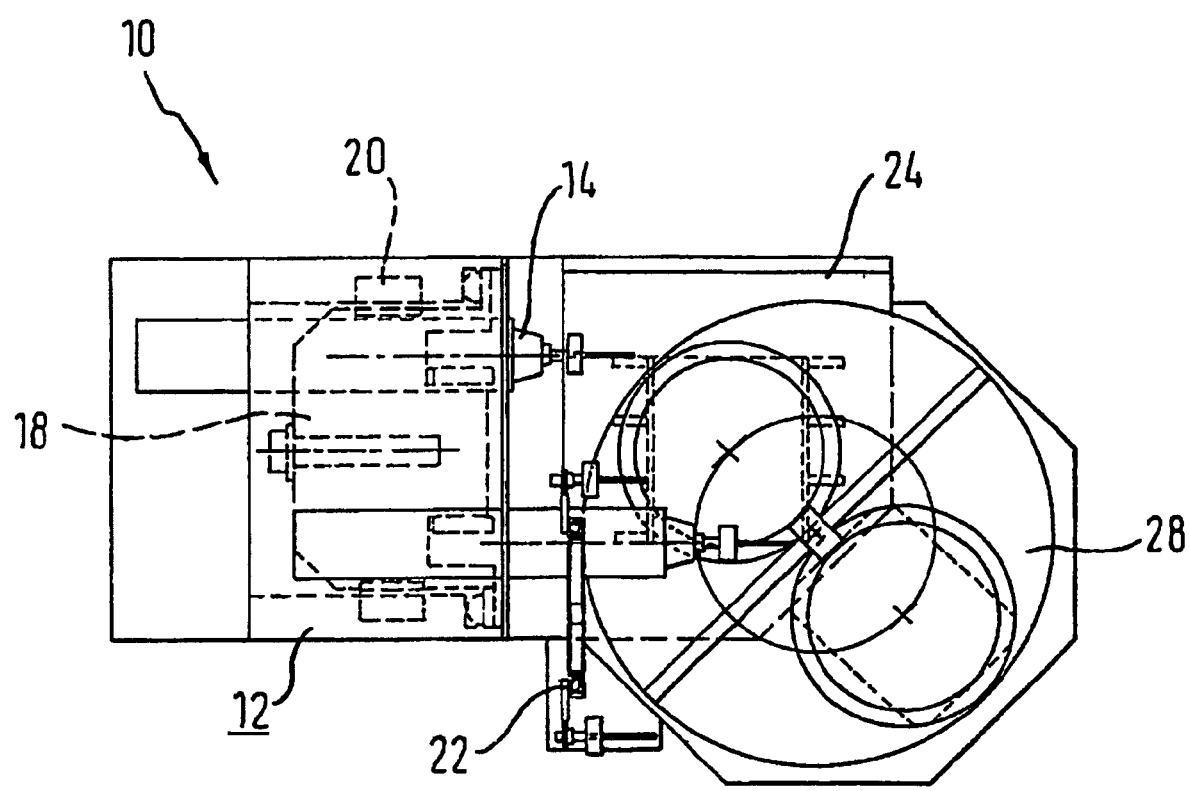
FIG. 1 shows a top view of a machine tool that serves to explain the present invention.

FIG. 1 depicts a top view of a machine tool 10 which is ideal for machining metallic workpieces, especially workpieces made of light metal. The machine tool 10 comprises a machining module 12 on which a spindle 14 is supported such that the spindle axis extends horizontally. This can be readily identified in the side view depicted in FIG. 2. The spindle 14 is in turn supported on a pivoting arm 16 such that the spindle can move horizontally in a straight line on the pivoting arm 16, i.e. in a horizontal direction parallel to the spindle axis. The pivoting arm 16, for its part, is rotatably supported on a bracket 18, with the pivoting movement extending on a plane perpendicular to the spindle axis. The bracket 18 is in turn supported on the machining module in a vertically slidable fashion. Linear drive mechanisms 20, for example, are provided for this purpose.

Machining units of a different design are likewise possible, such units comprising a horizontally attached spindle. Preferential use is, however, made of triaxial machining units, because they exhibit greater flexibility with respect to the machining of workpieces.

Figure 2:
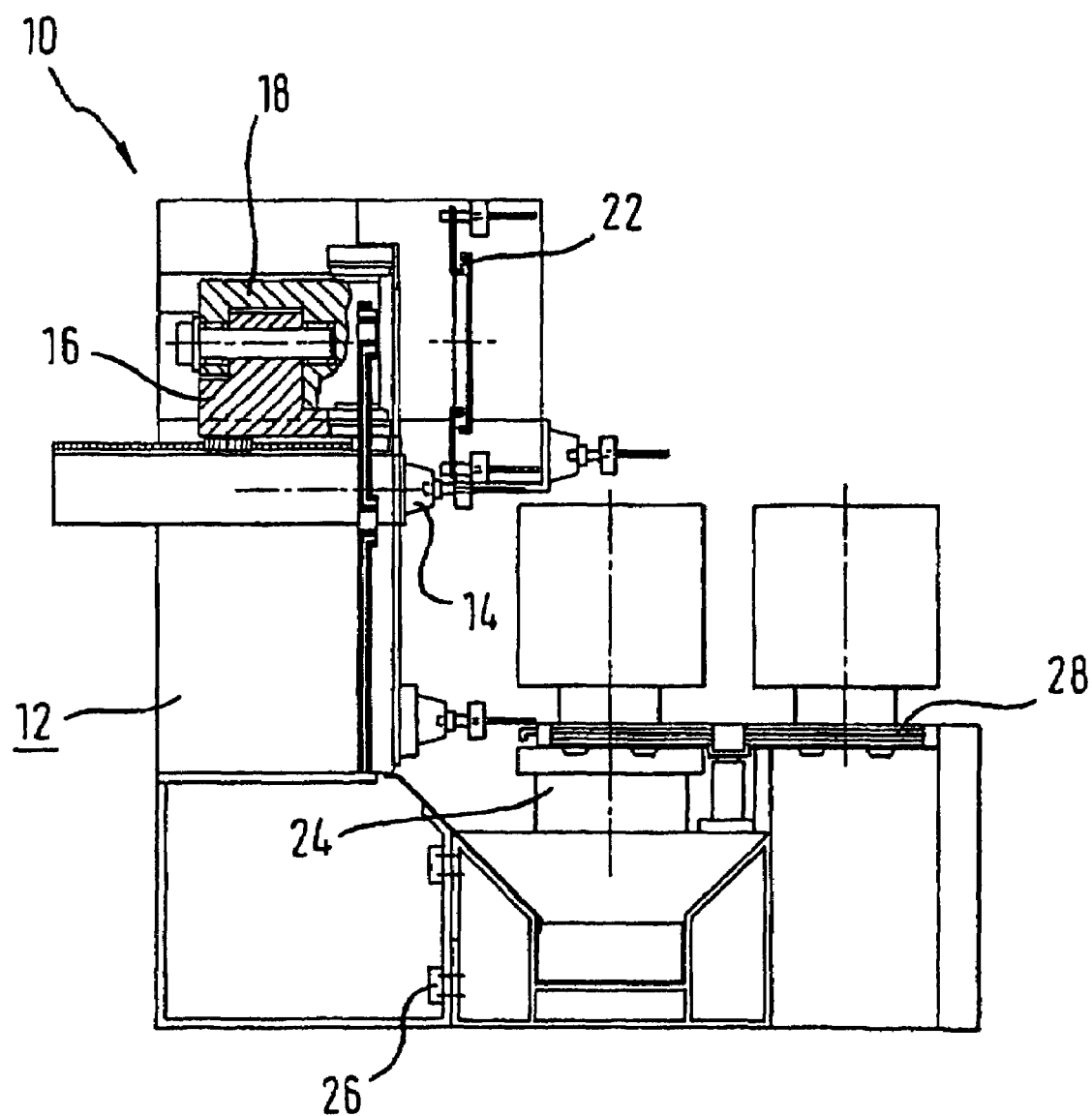
FIG. 2 shows a side view of the machine tool depicted in FIG. 1.

In the machine tool illustrated in FIGS. 1 and 2, the machining module 12 has one spindle respectively, with the spindle being nevertheless depicted in various positions.

Finally, a tool magazine 22 is attached to the machining module 12 so that tools which are needed to machine the workpiece can be loaded into the main spindle, removed therefrom and then returned to the tool magazine. This thus enables tools to be changed over rapidly, which in turn reduces the times during which the machine tool does not perform machining.

A clamping module 24 is coupled to the machining module 12. This clamping module 24 is essentially designed as a cuboid and is provided at one of its vertical end faces with means 26 for coupling the machining module, said means making it possible to couple the clamping module rigidly to the machining module 12. The clamping module 24 is designed as an NC turntable which enables the workpieces to be rotated around a vertically extending axis whenever they are mounted on the turntable. As a result, it is possible to present the workpieces in different positions with respect to the spindle during machining.

Finally, the clamping module 24 is connected to a pallet changeover device 28 in such a way that the pallet changeover device 28 is attached at an angle of about 45° relative to the mid-plane of the machining module and of the clamping module, which mid-plane extends parallel to the direction of the spindle axis. This offers ready access to the pallet changing module 28, such access being necessary particularly during set-up, that is to say while the workpieces are being mounted or detached.

In the embodiment depicted in FIGS. 1 and 2, the pallet changing module is adapted to receive two pallets. It is in principle advantageous to provide more than one pallet receiving facility, because the set-up procedure for the next or preceding workpiece can then be performed in parallel with the production time, i.e. while a workpiece is being machined.

The clamping module 28 is in turn designed as a turntable, the rotary axis of which runs parallel to the rotary axis of the clamping module's turntable, i.e. it extends vertically. In the machine tool depicted in FIGS. 1 and 2, the rotary axis intersects an imaginary line that extends from the centre of the essentially cuboid clamping table 24 as far as one of its corners, namely the corner in the bottom right of FIG. 1. The asymmetry of the manner in which the turntable 28 as a pallet changing module is attached is chosen in such a way that the pallet changing module protrudes over two of the vertically extending end faces of the essentially cuboid clamping module 24, namely the lower end face in FIG. 1 and the right-hand end face in FIG. 1. This permits ready access to the machining chamber from the third end face, which is not hindered by the protruding turntable.

Figure 3:
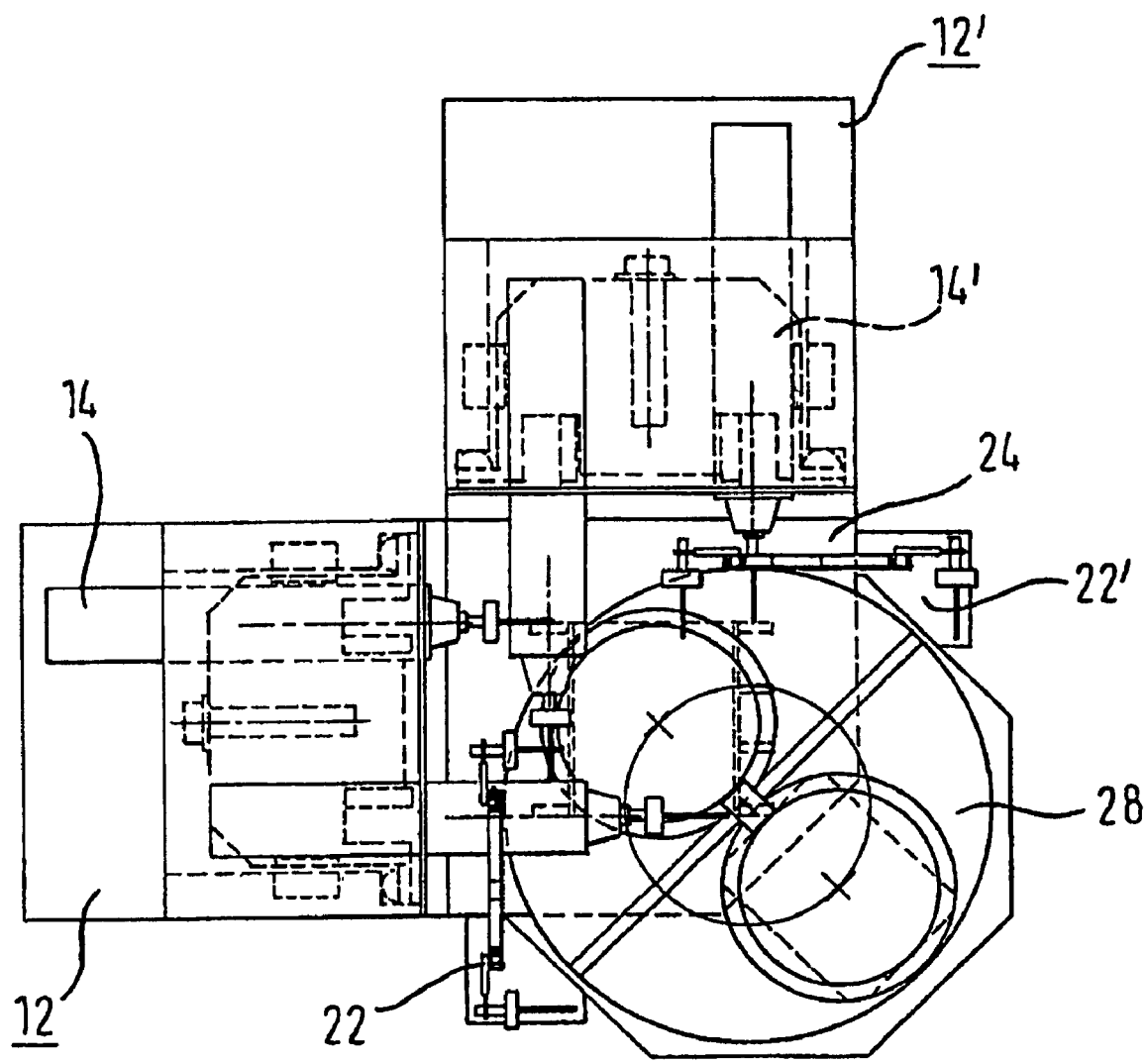
FIG. 3 shows a first embodiment of the machine tool as defined by the invention.

FIG. 3 depicts an embodiment of the machine tool 10 as defined by the invention. The set-up is essentially the same as that shown in FIG. 1, with the difference being that a second machining module 12' is attached to the free end face of the cuboid clamping module 24, above which end face the pallet changing module 28 in the first embodiment illustrated in FIG. 1 does not protrude. The spindles 14 of the first machining module 12 and the spindle 14' of the second machining module 12' are each positioned horizontally and at an angle of 90° relative to one another. In the embodiment shown in FIG. 3, the machining modules 12 and 12' are identical in design. It is, however, also conceivable to use two different machining modules 12 and 12', for example a triaxial machining module and a biaxial machining module, or two triaxial modules which nevertheless differ in their set-up.

As regards the second machining module 12', there is provided a second tool magazine 22' corresponding to the configuration of the first tool magazine 22 with respect to the first machining module 12. The configuration shown in FIG. 3 makes it possible to use two spindles 14 and 14' to simultaneously or alternately machine the workpiece that is mounted on the clamping module 24 and hence to ensure ready access to the workpiece and so ensure rapid machining. This is particularly advantageous when the workpiece clamping module is not designed as a turntable and thus does not permit the workpiece to undergo a rotational movement during machining, since the workpiece is then more readily accessible.

Figure 4:
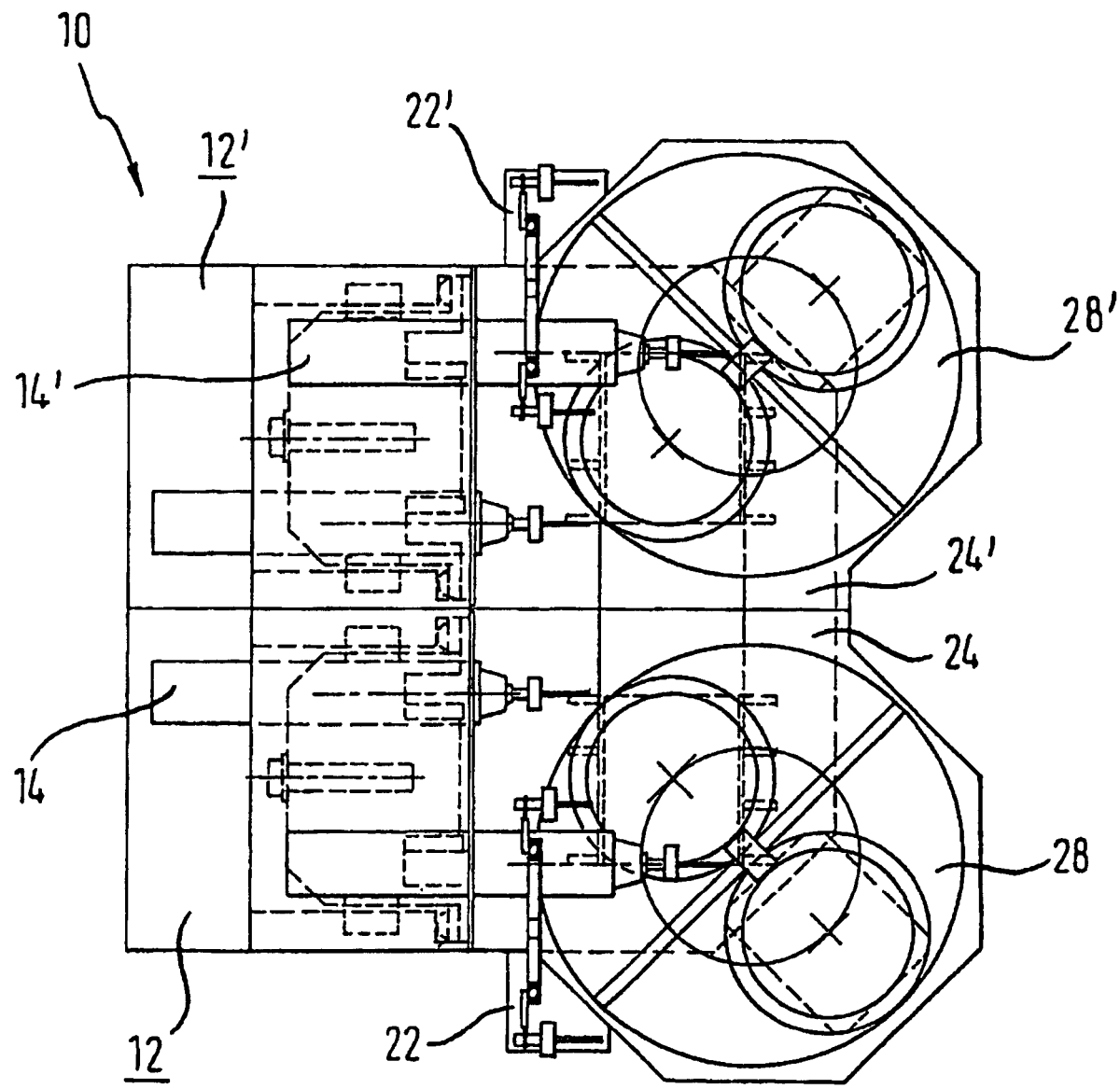
FIG. 4 represents a further machine tool which serves to explain the present invention.

A further machine tool is shown in FIG. 4. This machine tool includes two symmetrically positioned units which are each composed of a machining module, a clamping module and a pallet changing module. The machine tool 10 shown in FIG. 4 is designed as a so-called synchronous machine tool, i.e. two workpieces can be machined, independently of one another, by a spindle 14 or 14' respectively, for example by using different machining programs too. The set-up operations on the pallet changing module 28 or 28' can be executed independently of one another, with the result that, overall, it is possible to machine two workpieces simultaneously within a confined space, yet the machine tool 10 depicted in FIG. 4 remains compact. The mutually corresponding modules 12, 12'; 24, 24' and 28, 28' are each positioned symmetrically relative to one another with respect to a plane of symmetry which separates the first machining module 12 and the first clamping module 24 from the second machining module 12' and the second clamping module 24'. This layout, while retaining ever ready access to the pallet changing module 28 or 28', is brought about in that the pallet changing module 28 is positioned off-centre in each case, i.e. asymmetrically, relative to the respective clamping module 24 and machining module 12 or 24', 12'.

In consequence, the invention's essential aspect lies in the provision of a modular machine tool in which the asymmetrical configuration of a pallet changing module makes various machine tool designs possible, that is to say a single-spindle version, a dual-spindle version in which the spindles have an across-corner layout, or a dual-spindle version in which the spindles have a parallel configuration, without modifying the layout of the pallet changing module with respect to the clamping module.

The invention claimed is:

1. A machine tool for the machining of workpieces, comprising:
   two machining modules each having at least one spindle with a horizontally oriented spindle axis;
   at least one clamping module with a horizontally oriented clamping surface that is rotatable around a vertical axis and that is intended for at least one workpiece, said clamping module being configured for rigid coupling to said machining modules and said at least one clamping module and each of said machining modules having an imaginary mid-plane parallel to the spindle-axis direction;
   said machining modules being connected to said clamping module so that the spindle axes of the two machining modules are non-parallel; and
   at least one turntable pallet changing module, said at least one pallet changing module having a rotation axis being in an off-center position relative to each of the imaginary mid-planes which each extend parallel to the spindle axes, and said at least one pallet changing module being coupled to said clamping module asymmetrically with respect to the mid-planes.

2. The machine tool according to claim 1, wherein said at least one clamping module is essentially cuboid and said at least one pallet changing module is coupled to said at least one clamping module in such an off-center manner as to project over a maximum of two vertically oriented lateral faces of the cuboid.

3. The machine tool according to claim 1, wherein said at least one pallet changing module is coupled at an angle of 45° relative to the mid-planes of the machining modules.

4. The machine tool according to claim 1, wherein said at least one clamping module has vertically extending end faces, and said at least one pallet changing module is positioned such as to be essentially in the region of that point of intersection of two of the vertically extending end faces of the at least one clamping module at which no machining module is provided.

5. The machine tool according to claim 1, wherein at least one of said machining modules is designed as a triaxial machining unit.

6. The machine tool according to claim 1, wherein at least one of said machining module comprises at least one tool magazine.

7. The machine tool according to claim 1, wherein said at least one clamping module includes a turntable.

8. The machine tool according to claim 1, wherein said at least one pallet changing module is adapted to receive at least two pallets.

9. The machine tool according to claim 1, wherein said at least one turntable pallet changing module is designed as a turntable having a rotation axis parallel to the rotation axis of the at least one clamping module.

10. The machine tool according to claim 1, wherein said machining modules are connected to said at least one clamping module such that their respective spindle axes are at an angle of 90° relative to one another.

* * * * *